G. H. RABENALT.
CORE FOR USE IN MAKING ELECTRIC STORAGE BATTERY PLATES.
APPLICATION FILED NOV. 17, 1914.
1,192,224.
Patented July 25, 1916.
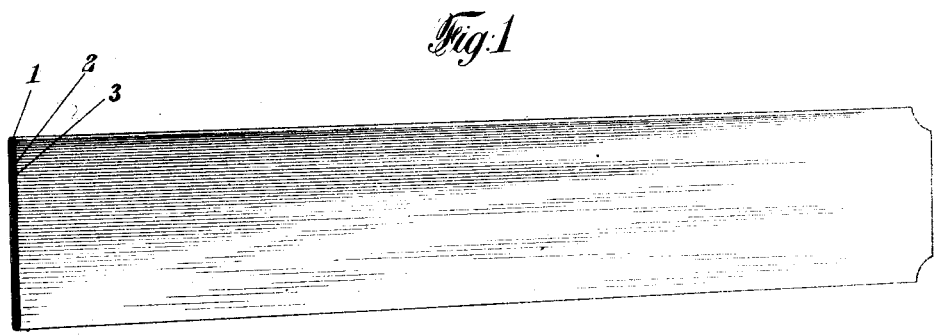
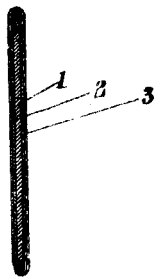

UNITED STATES PATENT OFFICE.

GUSTAV H. RABENALT, OF BUFFALO, NEW YORK.

CORE FOR USE IN MAKING ELECTRIC STORAGE-BATTERY PLATES.

1,192,224.　　　　Specification of Letters Patent.　　Patented July 25, 1916.

Application filed November 17, 1914. Serial No. 872,592.

*To all whom it may concern:*

Be it known that I, GUSTAV H. RABENALT, a citizen of the United States, and a resident of the city of Buffalo, county of Erie, and State of New York, have invented certain new and useful Improvements in Cores for Use in Making Electric Storage-Battery Plates, of which the following is a specification.

My invention relates to cores for use in making electric storage battery plates, and particularly to those known as duplex plates, such, for instance, as disclosed in application of Rufus N. Chamberlain, Serial No. 824,599, filed March 14, 1914.

In the manufacture of plates of the above character it is necessary to place cores in the spaces, which subsequently form acid channels, in order that when pasting the plate the entire casting will not form a solid plate. After the paste, which subsequently constitutes the active material of the plate, has been placed in position, it is desirable that the cores be removed in order to leave a free and open channel for the circulation of acid. These channels in plates as ordinarily constructed range from one-thirty-second to one-sixteenth of an inch in thickness. Consequently the cores which form these spaces are very thin.

In casting the grid it necessarily has some unsmooth places so that the cores do not always readily and easily go into place. After the plates have been pasted the cores are held quite tightly in position by the active material bearing upon both sides of the core. In view of the above considerations it is necessary that the core have considerable strength so that when it is desired to place the core in the grid it may be forced into position notwithstanding the fact that it may encounter some resistance due to the unsmooth portions of the cast grid. Likewise it is necessary to have this strength in removing the core from the pasted plate, otherwise, the core is liable to break in parts and render the plate worthless. Another consideration is that the material from which the cores are made should either be inherently acid-resistant, or should be supplied with some material which will render it acid-resistant. A still further consideration in this connection is that the core should contain some substance which will act as a lubricant between the paste and the core. This is important for the reason that if some means are not used to prevent the paste from sticking to the core, numerous disadvantages and imperfections will result. Some of these are, that the paste will be drawn away from the ribs of the grip on one side of the pocket, thus making the plate mechanically imperfect. Another is that the interior surface of the paste will be rendered rough and non-uniform with the consequent reduction in efficiency of the plate. Other disadvantages will be apparent.

It is the object of my invention to produce a core which will avoid the disadvantages above recited and, on the other hand, possess all of the advantageous features necessary in the manufacture of this type of plate—that is, a core having comparatively great strength, being acid resistant, either inherently or rendered so. and having the necessary lubricating qualities, either inherent or being treated with a substance giving the necessary qualities.

My invention will be more fully understood by reading the following description, taken in connection with the accompanying drawings, which form a part of this specification, and in which—

Figure 1 shows a perspective view of the core; and Fig. 2 shows an enlarged section.

The core shown in Fig. 1 may be of any desired dimensions. At present, I prefer to make the core up of a mechanically strong member 1 with a coating of acid-resistant material 2 thereon, and a coating of lubricant 3 on the acid-resistant material. I have found, by experience, that the member 1 may be satisfactorily made of steel, and the coating 2 may be made of lead, and the coating 3 may be made of paraffin. This combination gives a mechanically strong core with the acid-resistant feature, and also a lubricating feature, the importance of all of which has been above stated.

It is found that when the core is complete it will have the three features of strength, acid-resistance and the necessary lubricating qualities. It is immaterial as far as my invention is concerned whether all these qualities are found in a single piece of suitable material or that some two of these qualities are possessed by one material and the other supplied by some treatment adding the third quality to it. For instance, a material which has the necessary strength and 's acid-resistant may be treated with paraffin, or some other lubricant, or some other material which has the acid-resistant and lubricating features, and which will not be mechanically strong enough for this purpose may be used as a coating on a steel or other strong member to give the necessary strength.

In view of the above disclosure, I do not limit my invention to the specific embodiment above described but intend that my claims shall include equivalent forms of the device.

In the following claims I have used the word "rigid" in the sense that it designates a member or members having the quality of inherent strength, tensile or compressive, such as steel, and not in the sense that the device is not flexible.

Having described my invention what I claim as new and desire to secure by Letters Patent is:—

1. A core for use in making duplex storage battery plates, comprising a member of suitable dimensions which is non-fragile, acid-resistant and having sufficient lubricating qualities to allow it to be readily removed from a plate after the same has been pasted.

2. A core for use in making duplex storage battery plates, comprising a thin piece of rigid material rendered acid-proof and lubricated to prevent the lead oxid paste from adhering thereto.

3. A core for use in making duplex storage battery plates, comprising a thin piece of non-fragile material being acid-resistant and having sufficient lubricating qualities to allow it to be readily removed from a plate after the same has been pasted and dried or hardened.

4. A core for use in making duplex storage battery plates, comprising a member of non-fragile material which is not attacked by sulfuric acid and having a material thereon for lubricating said member, whereby it may be placed in position before the plate is pasted and readily removed therefrom after it is pasted.

5. A core for use in making duplex storage battery plates, comprising a thin piece of steel having a coating of lead thereon to render it acid-proof and a coating of paraffin thereon to lubricate it so that it may be readily removed from the plate after it is pasted without injury to said paste.

6. A core for use in making duplex storage battery plates, comprising a thin piece of steel having a coating of lead thereon to render it acid-proof and a coating of paraffin thereon to lubricate it so that it may be readily removed from the plate after it is pasted, and dried or hardened without injury to said paste.

In testimony whereof, I have signed my name to this specification, in the presence of two subscribing witnesses.

GUSTAV H. RABENALT.

Witnesses:
 NEWTON A. BURGESS,
 EDWIN D. SEGER.